(No Model.)　　　　　M. G. HUBBARD.　　　2 Sheets—Sheet 1.
TWO WHEELED VEHICLE.
No. 304,268.　　　　　　　Patented Aug. 26, 1884.
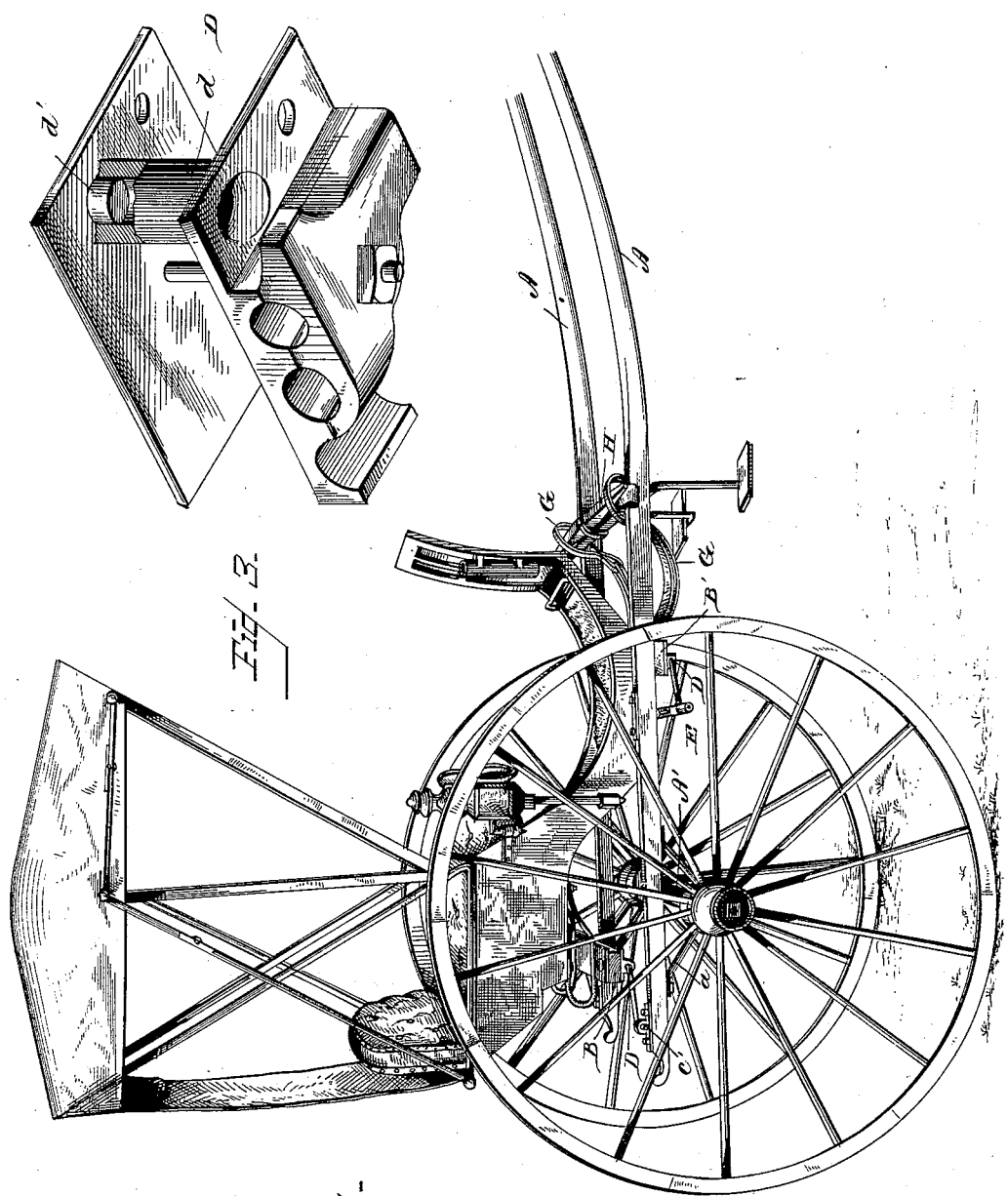
WITNESSES
Franck L. Ourgnde
Rex D. Smith
INVENTOR
Moses G. Hubbard
by A. M. Smith
Attorney (No Model.) 2 Sheets—Sheet 2.
M. G. HUBBARD.
TWO WHEELED VEHICLE.
No. 304,268. Patented Aug. 26, 1884.
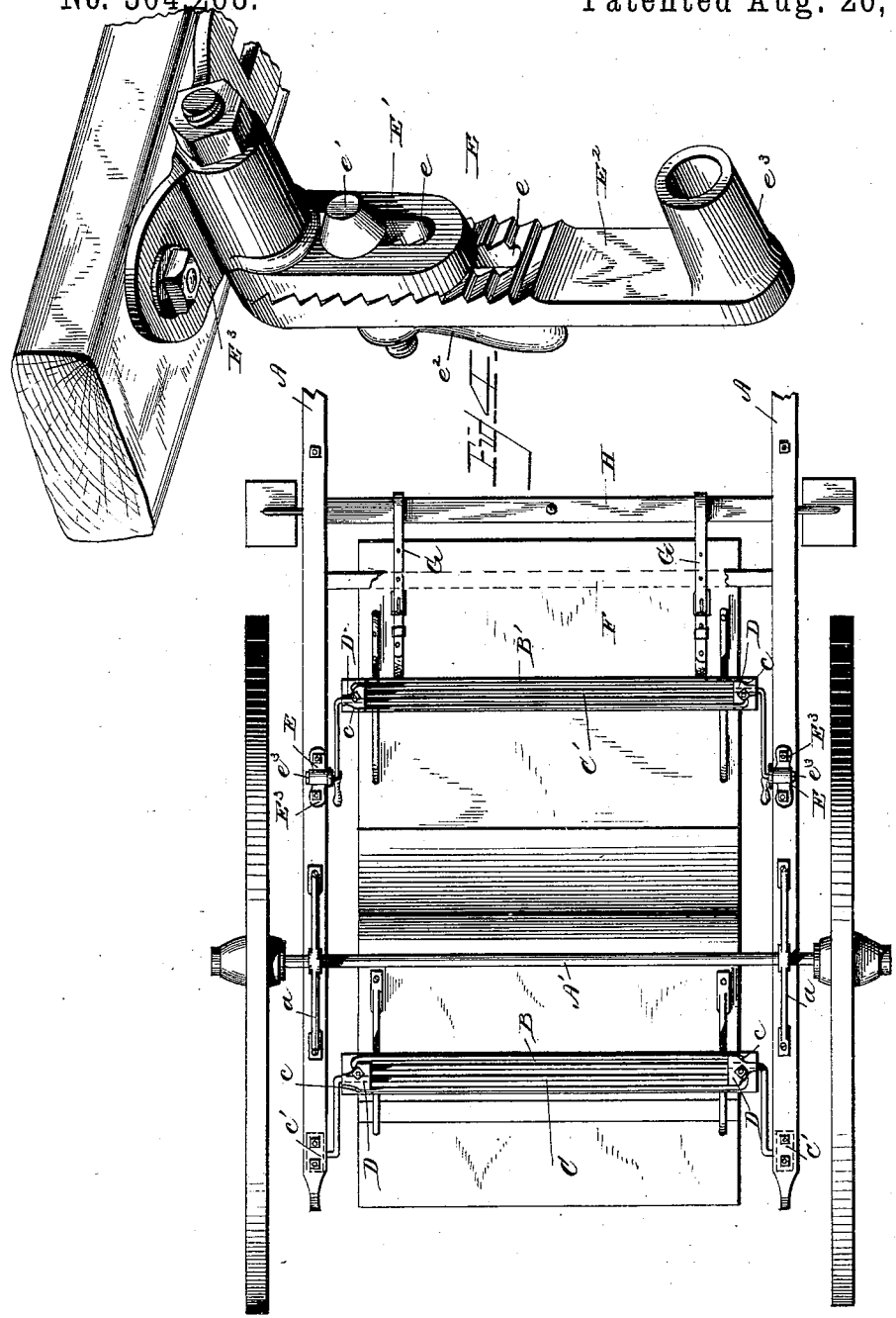
WITNESSES
Franck L. Ourand
Rex. M. Smith
INVENTOR
Moses G. Hubbard
by A. M. Smith
Attorney

UNITED STATES PATENT OFFICE.

MOSES G. HUBBARD, OF NORRISTOWN, PENNSYLVANIA.

TWO-WHEELED VEHICLE.

SPECIFICATION forming part of Letters Patent No. 304,268, dated August 26, 1884.

Application filed April 19, 1884. (No model.)

*To all whom it may concern:*

Be it known that I, MOSES G. HUBBARD, of Norristown, county of Montgomery, and State of Pennsylvania, have invented a new and useful Improvement in Two-Wheeled Vehicles, of which the following is a full, clear, and exact description, reference being had to the accompanying drawings, making part of this specification.

My invention relates to an improvement in two-wheeled vehicles, and more particularly to the construction and arrangement of the springs, to the hanging of the body of the vehicle with reference to the motion of the horse, and to the lateral action of the thills against the horse; also, to a novel manner of adjusting the body of the vehicle relatively to the thills, for the purpose and substantially as hereinafter set forth.

It is well known that the wheel of a two-wheeled vehicle exerts considerably more force upon the body and seat thereof when passing over an obstruction than is exerted by the wheel of a four-wheeled vehicle. It is therefore desirable, in this convenient form of carriage, to so construct and arrange its springs as to diminish as far as possible this jar or shock. In this invention I aim to construct the springs and arrange the other parts of the vehicle in such manner as to attain the greatest practical elongation of the springs in the best and most convenient manner, and to so hang and support the vehicle-body at its forward end that the disagreeable jarring heretofore caused by the motion of the horse will be avoided.

In the accompanying drawings, Figure 1 represents a perspective view of a two-wheeled vehicle, showing my improvements and their relative arrangement. Fig. 2 is a bottom plan view of same, showing the relative arrangement of the spring-bars, the manner of securing the long torsional springs thereto, and the manner of connecting the said springs with the thills of the vehicle. Fig. 3 is a detail view of one of the journal-boxes detached, and Fig. 4 a detail view of one of the adjustable links connecting the forward spring-bar and spring with the thills.

Like letters denote like parts.

To accomplish the results hereinabove enumerated in a manner at once cheap, simple, and durable, the thills A A of the vehicle are constructed of such length as will adapt them to extend backward somewhat beyond and in rear of the axle A', to which they are secured or upon which they are mounted by means of iron brackets $a\ a$, pendent from said thills and extending downward to the axle, to which they are secured in any usual manner. It is preferred to have the thills A A, when the horse is hitched to the vehicle, nearly horizontal for a considerable distance forward of the axle, and then to curve upward slightly to conform to the thill-straps of the harness and present a graceful appearance. The thills A A are located as far apart on the axle as practicable, for the double purpose of bringing their points of attachment to the axle near the wheels of the vehicle for strength, and of permitting the use of the long torsional springs hereinafter described.

B B' represent the two spring cross-bars of the vehicle, upon which the vehicle-body is mounted and supported in the ordinary manner. These spring-bars extend nearly from thill to thill, and form a support for the attachment of long springs C C', made of round steel bars, and greatly increased in length by constructing them in the U or recurved form. The greatest degree of delicacy and safety is thus secured by the unusual length of the spring-rod permitted by this arrangement, with all the agreeable action resulting from the dead-center movement of the short crank-arms, the peculiar action of which is more fully described in a pending application filed by me on or about March 14, 1884, Serial No. 124,178. To properly journal these springs C C', I attach them to the long spring-bars by malleable-iron journal-boxes D, similar to those described in my said pending application referred to, but with this important difference: while the under surface of the body would permit the use of a journal-box of any desired lateral length for attaching the fixed end of the spring by an arm extending laterally therefrom, the narrow limit of a spring-bar requires that this arm should be vertical. I therefore extend this arm of the spring-rod (designated by $c$) up through a short tube, $d$, cast on the journal-box, and passing up through the spring-bar. A small projection, $d'$, extending down from the upper plate of the journal-box into the top of said tube aids in supporting it laterally. These journal-boxes are attached to the ends of the spring-bars, as shown in Fig. 2, and are of the form substantially as shown in detail in Fig. 3. The crank-pins or outer journals of the rear springs are pivoted within journal-boxes $c'$, bolted or otherwise secured to the ends of the thills; but as it is necessary to have a free and independent action of the forward springs to give the required vibration for overcoming the motion of the horse, the crank-pins or outer journals of the forward springs are pivoted in pendent links E E, suspended from the thills, this construction and arrangement leaving the forward springs entirely free, to be acted upon by the slightest force without moving the body in any direction. The links E E are made adjustable in length for facilitating the hanging or leveling of the vehicle-body to adapt it to the inclination of the thills, which varies in their manufacture. By this simple device, also, the level of the thills may be conveniently adjusted for adapting the vehicles to horses of different heights. Both links E E are alike, and it will therefore be necessary to describe only one of them.

The link E (best shown in Fig. 4) is composed of two portions, $E'$ and $E^2$, both of which are correspondingly ribbed or corrugated upon their inner adjacent faces, and also provided with long slots $e\ e$ and a clamping-bolt, $e'$, and thumb nut or lever $e^2$, whereby, when the portions $E'\ E^2$ are brought near together and the ribs of one portion engage with, enter, and fill the corresponding corrugations or grooves of the other portion, they may be securely clamped together, and any liability of the parts slipping one upon the other or of becoming displaced obviated. The upper portion, $E'$, of the link is pivoted to a plate, $E^3$, bolted or otherwise secured to the thill, and the lower part, $E^2$, is provided with a sleeve portion, $e^3$, upon its lower extremity, serving as the bearing in which the crank-arm or outer journal of the long torsional spring $C'$ is pivoted.

The axle $A'$ would act as a safety-bar in case the rear support of the body should become detached. To attain the same degree of safety for the forward end of the body, a safety-rod, F, may be extended across the body from thill to thill, curved downward so as to pass beneath and clear said body; or, if preferred, one or more safety-straps, G G, may be employed, attached to the forward end of the body and to the thills A A, or front cross-bar, H, which extends from thill to thill in front of the body, for the attachment of the whiffletree and steps of the carriage.

When the phæton form of body is used, the forward end thereof may be placed upon the front spring-bar, $B'$, and the rear end supported upon iron brackets interposed between the same and the rear spring-bar, B; or, if preferred, the two spring-bars B B' may be located at different heights to correspond with and accommodate the peculiar shape of the vehicle-body.

The best results are to be attained by constructing the forward springs, $C'$, much lighter and more delicate than the rear ones, and locating the rear spring as near the center of gravity as practicable, so that in effect the weight or load is principally supported on the rear spring, thereby permitting the greatest practicable delicacy of spring in front, to allow the forward end of the thills to rise and fall by the motion of the horse without affecting the body of the carriage.

Material advantage is attained by inclining the crank-arms of the springs C C' backward from their centers of motion in all styles or patterns of vehicles; but the peculiar and most important effect resulting from this position of the rear crank-arms in this form of vehicle consists in its entirely overcoming the lateral thrust of the thills against the sides of the horse when the wheel strikes an ordinary obstacle. This peculiar action may be explained as follows: The rear crank-arms control the forward and backward or horizontal position of the load, and as one of them cannot descend without pulling on the load in a backward direction, it must equally pull ahead on the wheel to carry it forward when it strikes an obstruction. In practice this action is so perfect that the horizontality of the thills is preserved, thus overcoming one of the principal objections to two-wheeled vehicles.

When links are employed for suspending the forward spring, $C'$, and when light steel is used for the springs, it is important to secure the rear crank pins or arms in their journal-boxes by riveted washers or nuts on their outer ends. Thus the lateral strength of both crank-arms is secured for sustaining the lateral thrusts of the vehicle-body.

Having now described my invention, I claim as new—

1. In a two-wheeled vehicle, the combination, with the axle thereof, of the long thills secured thereto near the wheels, the long torsional springs, and the spring-bars for supporting the vehicle-body on the said springs, substantially as described.

2. In a two-wheeled vehicle, the long spring-bars for supporting the vehicle-body, in combination with the U-shaped or recurved springs, the crank-arms of which are pivoted and rest upon the thills, substantially as described.

3. In a two-wheeled vehicle, the cross-bars secured to the vehicle-body, in combination with the thills rigidly secured to the axle, and the interposed recurved or U-shaped torsion-springs connecting said cross-bars with the thills, and having crank-arms inclined backward from their centers of motion or points of attachment to the cross-bars, substantially as described.

4. In a two-wheeled vehicle, the rear spring-bar and spring, located directly beneath the load, and serving as a pivoted main support for the same, in combination with a light recurved torsional spring extending across the forward end of the body, for the purpose substantially as described.

5. In a two-wheeled vehicle, the long torsional spring supporting the forward end of the body, in combination with pendent links interposed between the crank-arms of said spring and the thills or side bars of the frame, substantially as described.

6. In a two-wheeled vehicle, the combination, with the thills thereof and the forward torsional spring of the vehicle, of the swinging and interposed adjustable links, substantially as described.

7. In a two-wheeled vehicle, the thills thereof, extended backward in rear of the axle and rigidly secured thereto, in combination with the vehicle-body, pivoted at its rear end in fixed bearings upon the thills and at its front end in pendent swinging links, substantially as described.

8. The combination, with the recurved torsion-spring, of the journal-box for securing said spring to the spring-bar, provided with a vertical tube, cast upon or otherwise secured thereto, for holding or securing the end of said spring, in the manner substantially as described.

In testimony whereof I have hereunto set my hand this 12th day of April, A. D. 1884.

MOSES G. HUBBARD.

Witnesses:
 JAS. W. SCHRACK,
 GEO. N. HEAVNER.